Figure 1:
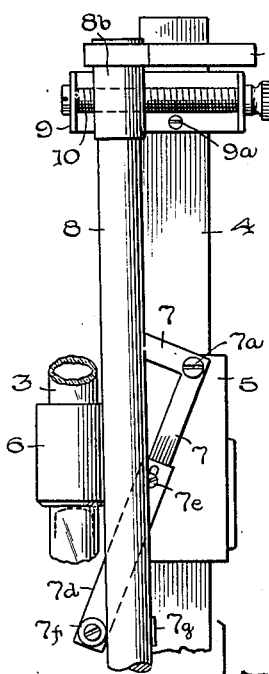

Feb. 20, 1951

E. C. HASS 2,542,671

CORRECTING MECHANISM FOR MERCURY COLUMN
TYPE MEASURING INSTRUMENTS

Filed Dec. 16, 1947

*INVENTOR.*
EDWARD C. HASS

BY Ralph B. Stewart

*ATTORNEY*

Patented Feb. 20, 1951

2,542,671

UNITED STATES PATENT OFFICE 2,542,671

CORRECTING MECHANISM FOR MERCURY COLUMN TYPE MEASURING INSTRUMENTS

Edward C. Hass, Prince Georges County, Md.

Application December 16, 1947, Serial No. 792,076

9 Claims. (Cl. 73—385)

1

This invention relates to a correction mechanism for measuring instruments, and a broad object of the invention is to provide an arrangement for automatically applying a compensating correction to a measuring instrument to correct for an error inherent in the instrument.

My invention is especially suitable for use on barometers, manometers, or other instruments where a predictable correction is to be applied to the reading. It is known that barometers and similar instruments using a column of mercury are subject to errors due to changes in temperature and gravity values at the location of the instrument. It has been customary in using instruments of this type to record the reading of the instrument as shown by a movable sighting device cooperating with a main scale, and the correct reading is then obtained by calculating the error under known temperature and gravity conditions and then adding (or subtracting) the error to the observed reading. This procedure is time-consuming and is subject to error due to the human element.

A specific object of my invention is to device an arrangement for use on instruments of the "mercury column" type for automatically correcting the reading for errors due to temperature or gravity, or for correcting for both types of errors.

The correction is applied automatically by producing relative movement between the main scale and the movable index member cooperating with the scale while maintaining the sighting element in line with the meniscus of the column. Such relative movement may be produced either by fixing the sighting ring with respect to the movable slide and raising or lowering the vernier strip or index member with respect to the slide, or by fixing the vernier strip or index member with respect to the slide and moving the sighting ring with respect to the slide. Assume that a correction of minus 2 mm. is required at a given point to obtain the true reading; if the vernier strip is movable, then the correction mechanism will automatically move the strip downwardly 2 mm. relative to the sighting ring and will automatically subtract the error from the normal scale reading and will provide the true scale reading. Likewise, if the arrangement shifts the sighting ring with respect to the slide, then the sighting ring will be raised 2 mm. relative to the slide and it will be necessary to lower the entire indicator slide assembly 2 mm. to sight the meniscus of the liquid column, thus substracting 2 mm. from

2 the normal reading and producing the true reading.

The relative movement is produced by an elongated cam element arranged alongside of the mercury column and having a cam surface which departs horizontally from a vertical reference line by amounts proportional to the corrections to be applied to the readings at different points on the mercury column. A cam follower moves with the sighting slide, senses the amount of cam surface departure, and controls suitable means to translate the departure into relative movement between the sighting ring and the scale index. In the case of an accumulative linear error, such as the temperature error in a mercury column, the cam may take the form of a straight bar or rod inclined to a vertical reference line.

While my invention is especially useful on barometers, manometers and similar instruments, it will be obvious that it may be applied to any instrument in which a condition responsive member moves along a rectilinear path and is subject to certain inherent errors which are to be corrected.

The accompanying drawing shows the invention applied to a barometer for correcting the readings with respect to temperature and gravity.

Figure 2:
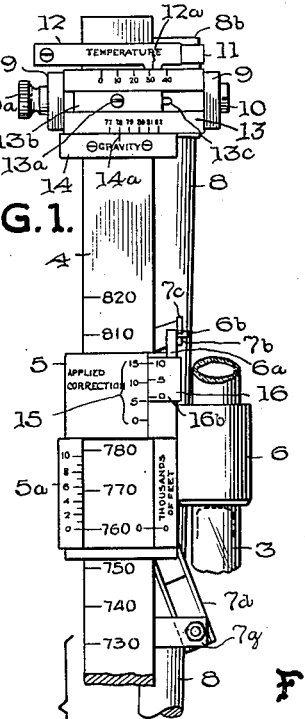
Figure 3:
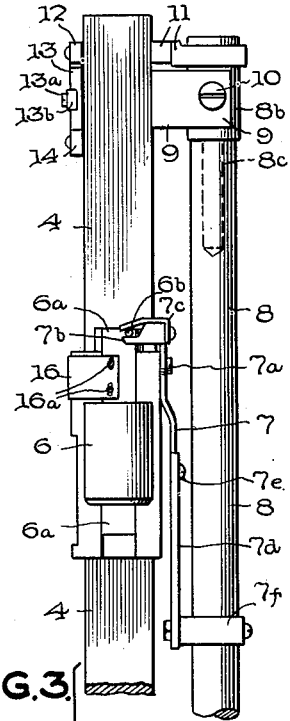
Figure 4:
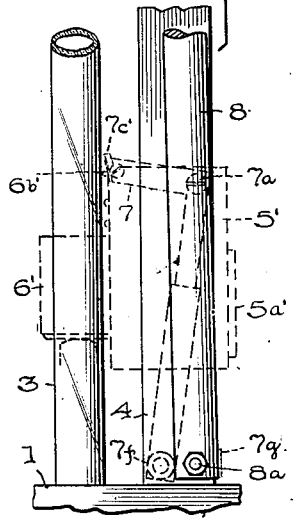
Figure 4:
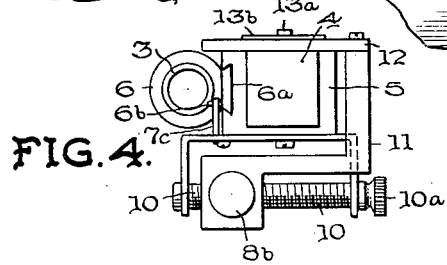

Figure 1 is a front elevational view of a barometer with the central portion thereof broken away; Figure 2 is a rear elevational view of the barometer shown in Figure 1; Figure 3 is an elevational view of Figure 1 taken from the right of that figure but with the mercury tube removed; and Figure 4 is a top view of Figure 1. In Figures 1 and 2 the indicator slide is shown in two different positions although only one slide is used.

Referring to the drawing, the barometer is provided with a suitable base 1 which supports a cistern or well 2 containing mercury, the well being suitably connected to the lower end of a transparent tube 3 supported vertically on the base 1. A vertical scale bar 4 is also supported on base 1 parallel with the tube 3 and carries on the front face thereof, and at one edge, suitable graduations for indicating the barometric pressure in millimeters. The upper end of mercury tube 3 is provided with the usual connection, not shown, for evacuating the upper end of the tube and closing it off, or for connecting it to atmosphere, in well known manner. The well 2 contains a quantity of mercury M the upper surface of which is subject to atmospheric pressure. When the upper end of tube 3 is evacuated, the mercury will rise in the tube to a height dependent upon the pressure in the locality of the barometer. When the upper end of the tube 3 is open to atmospheric pressure, the mercury level within the tube 3 is the same as the level within the well 2 as shown in the lower part of Figure 1.

For the purpose of reading the height of the column of mercury in tube 3, an indicator slide assembly is mounted for sliding movement along the scale bar 4 and carries a sighting ring which surrounds the tube 3 and also carries a vernier scale or index which cooperates with the scale on bar 4. The slide assembly includes a slide 5 mounted on the bar 4 which preferably is of square or rectangular cross-section. The slide 5 surrounds the bar 4, but a window is formed in the front side of the slide to expose the graduations on the bar 4, and an index in the form of a vernier scale 5a is formed on one side of the window to cooperate with the graduations on the bar 4 as shown in Figure 1. The indicator assembly also includes a sighting ring 6 surrounding the mercury tube 3 and mounted on a dovetail bar 6a which is positioned for sliding movement in a dovetail slot formed in one side wall of the slide 5, see Figure 4. On the back side of the slide 5, a bellcrank lever 7 is pivotally supported by screw 7a secured to the slide 5. One arm of the lever 7 extends beyond the right side of the bar 4 in Figure 1 and is bent at right angles to pass in front of the bar 6a. The end of the arm is provided with a horizontal finger 7b which passes beneath a pin 6b extending out from the face of the bar 6a. A spring finger 7c secured to the arm of correcting lever 7 holds the pin 6b in engagement with the finger 7b of the lever 7. The lower arm of lever 7 is provided with an adjustable extension 7d secured thereto by screw 7e, and the lower end of the extension 7d is provided with a roller 7f positioned to bear against a vertically extending rod 8 which constitutes a correcting cam. The roller 7f is maintained in contact with the rod 8 by means of a spring 7g secured to the arm extension 7d and having its free end extending around and engaging rod 8 on the opposite side from the roller 7f.

From the foregoing it will be understood that the correcting lever 7 determines the relative position of the sighting ring 6 with respect to the slide 5 or with respect to the vernier scale or index 5a carried on the slide, and the position of the ring 6 with respect to the vernier scale may be varied by shifting the angular position of the lever 7.

The cam rod 8 is pivoted at its lower end on a pin 8a secured to the bar 4, and the pivotal axis of the rod 8 is located in the same horizontal plane with the axis of roller 7f when the sighting ring 6 is positioned to indicate the level of the mercury when the upper end of tube 3 is open to atmospheric pressure. This position of the slide is shown at 5' in the lower parts of Figures 1 and 2 where the parts of the indicator slide assembly are primed to distinguish from another position of the slide shown in the upper parts of Figures 1, 2 and 3.

In order that the cam rod 8 shall apply corrections to the indicator assembly, the upper end of the rod is mounted for tilting adjustment in the plane of movement of roller 7f. One suitable mounting for the upper end of rod 8 involves a head 8b mounted on the upper end of the rod and having a stem 8c fitting into a bore formed in the upper end of the rod to permit sliding movement of the head axially of the rod 8. A U-shaped bracket 9 is secured on the back side of the scale bar 4, and preferably the bracket is pivotally secured to the bar by means of a screw 9a to permit a slight tilting movement of the bracket about the screw 9a. A screw 10 having an adjusting knob 10a is journaled in the ends of the parallel arms of the bracket 9 and has threaded engagement with the head 8b of the rod 8, the arrangement being such that by turning the screw 10, the rod may be tilted to one side or the other of its vertical position in the plane of movement of roller 7f. Tilting of the rod 8 causes the cam surface of the rod to depart from a vertical reference line which passes through the point of contact of roller 7f with the rod when the indicator slide is in its lowermost position as shown at 5' in Figure 2. As the slide moves upwardly, the roller 7f senses the amount of departure of the cam surface from the reference line, and the lever 7 translates the departure into relative movement between the sighting ring 6 and the index 5a. Lever 7 is only one example of several known forms of motion translating arrangements which may be used for this purpose.

The arrangement for fixing the proper inclination of the cam rod 8 will now be described. Secured to the head 8b at the upper end of rod 8 is an L-shaped arm 11 having one arm extending from the head 8b parallel with the back of the bar 4 and the other arm extending parallel with one side face of the bar 4 as shown in Figure 4. The free end of the arm 11 carries a horizontal bar 12 which extends across the front face of the scale bar 4 as shown in Figures 1 and 4 and is provided with a reference mark or index 12a formed on the front face thereof at right angles to its lower edge. A flat plate or bar 13 is mounted on the front face of the scale bar 4 immediately below the index bar 12. The bar 13 is mounted for horizontal adjustment by any suitable means, such as by a clamping screw 13a passing through a clamping piece 13b and through a horizontal slot 13c formed in plate 13 and having threaded engagement with the scale bar 4. The plate 13 is provided with a graduated temperature scale formed on the front face along the upper edge thereof to cooperate with the index mark 12a on the bar 12. Plate 13 is also provided with graduations on the front face along its lower edge representing values of gravity. A gravity reference or index bar 14 is secured to the front face of scale bar 4 immediately below the plate 13 and is provided with a reference mark 14a positioned to cooperate with the gravity scale formed along the lower edge of the plate 13.

The pressure scale on the scale bar 4 is correct for a given temperature and a given gravity value. If the temperature in the locality of the barometer changes, or if the barometer is moved to a different elevation, the scale will no longer be accurate and corrections must be introduced.

The temperature scale carried by the plate 13 must be such that with the rod 8 in a vertical position, the index mark 12a is opposite the value of temperature for which the pressure scale is correct (usually 0° C.). Also, the gravity scale carried by the plate 13 must be so positioned that with the rod 8 in a vertical position the index mark on bar 14 is opposite the value of gravity for which the scale on bar 4 is correct (usually 980.665).

In using the barometer, the plate 13 is adjusted to the correct value of gravity for the location of the barometer and is clamped in this position. The screw 10 is now adjusted until the index mark on the bar 12 reaches a point on the temperature scale corresponding to the temperature at the location of the barometer. Adjustment of the screw 10 causes tilting of the cam rod 8 to one side or the other of the vertical position.

Assume that the barometer has been adjusted as shown in Figure 1, and the sliding indicator assembly has been moved to the lowermost position as shown at 5'. The arrangement should be such that the zero mark on the vernier scale 5a' is positioned opposite the zero mark of the pressure scale on bar 4. As the indicator assembly is moved upwardly on the bar 4, the angle of the correcting lever 7 changes due to the inclination of the rod 8, and this causes the sighting ring 6 to be moved upwardly with respect to the slide 5, and since the rod 8 is straight, the amount of relative movement between the ring 6 and the slide 5 will be proportional to the amount of movement of the slide from its lowermost position.

From the foregoing it will be seen that the cam device imparts an additional vertical movement to the sighting ring, over and above the vertical movement of the slide, and in proportion to the distance of movement of the slide from the zero position of the index.

For the purpose of indicating the amount of correction which is applied at any given position of the slide 5, a correction scale 15 is carried on the front face of the upper portion of the slide 5, and an L-shaped index plate 16 has one arm secured to the face of slide 6a by screws 16a, and the other arm of the plate 16 extends around and over a portion of the front face of the slide 5 and carries a vernier scale or index 16b in association with the correction scale 15. When the indicator assembly is in its lowermost position as shown at 5' in Figure 1, the zero mark of the vernier scale 16b is positioned opposite the zero mark on the correction scale 15, thus indicating a condition of no applied correction. As the indicator slide moves upwardly, the index scale 16b moves with respect to the applied correction scale 15 and indicates the magnitude of the applied correction. Thus, in the upper position of the slide 5 shown in Figure 1, for a pressure of 760 mm. a correction of a little more than 5 millimeters has been applied, as shown by the position of the zero mark on the vernier scale 16b with respect to the scale 15.

Corrections for temperature only may be made by setting the gravity scale at the value for which the main scale has been calibrated, and then setting the temperature scale at the temperature of the locality. Likewise, gravity corrections only may be applied by setting the temperature scale at the value for which the main scale is correct and adjusting the gravity scale to the gravity value of the locality.

Combined temperature and gravity corrections are provided by adjusting both temperature and gravity indicators to existing conditions. As the gravity scale is set it will be noticed that the temperature scale is also shifted and it will be necessary to readjust the temperature setting to bring it back to the same temperature setting. In this manner the two corrections are combined into one correction which is then applied to the reading. Since the value of gravity is constant for a given locality, the gravity correction will have to be changed only when the instrument is moved to a different gravity location.

For correction of non-linear errors, the cam face could be suitably shaped to give the desired curve. The graduations on the temperature and gravity correcting scales can also be unequally spaced to approximate almost any type of correction characteristic. However, for the arrangement shown only linear corrections are required, since the temperature and gravity corrections of a barometer or manometer for a given temperature and gravity are directly proportional to the height of the liquid column.

Although only two corrections are shown combined there is no limit to the number of corrections which can be added in the same manner as the temperature and gravity corrections are combined. For instance, a scale error correction could be added by adding an appropriate scale on the lower half of the gravity index bar 14 and making it movable like the temperature and gravity correction plate 13.

A temperature sensitive device may be employed automatically to set the temperature adjustment, and a gravity sensitive device may automatically control the gravity adjustment.

Advantages gained by having the scale reading the true reading are many. In addition to the obvious ones like greater speed, simplicity, and elimination of human errors in applying corrections, this invention opens a new field in automatic measuring and control devices. For instance, one of the greatest uses of barometers is in the calibration of aircraft altimeters. Present practice is to provide an altitude scale in altitude units alongside of the main scale of pressure units, as shown in the accompanying drawing. Due to temperature, gravity, and scale errors the altitude marks are correct under standard temperature and gravity conditions only, and an individual chart must be compiled for each instrument to show the pressure reading for each altitude point and for each temperature point and corrected also for the gravity at a particular station and the scale errors of a particular instrument. In order to get anywhere near adequate temperature and altitude coverage the chart must be bulky and is subject to human errors in compiling the corrections and transposing them to scale readings. Also a change in the location of the barometer involving gravity changes means that the entire chart must be remade, introducing the possibility of additional errors in computation. Therefore, the number of altitude points included in the chart is usually cut to a bare minimum. With a correction device of the type described above the altitude marks would be correct at any temperature or gravity and could be used for calibration purposes and could be increased to any number. The only additional work in adding altitude check points would be that required to cut them into the scale. In fact, any altitude could be used for a check point by the use of published pressure-altitude tables (see N. A. C. A. Report #538) which would be applicable to all instruments at all locations. If an automatic reading device were installed on the barometer and coupled with a pressure regulator it would be possible to remotely dial the pressure-altitude desired and have the pressure automatically brought to that point. This would still further decrease the possibilities of errors and materially increase the reliability of aircraft altimeters. A similar device could be used for calibration of airspeed indicators.

I claim:

1. In an instrument for indicating the magnitude of a variable condition, the combination of a transparent, rigid tube arranged in a vertical position and containing a mercury column movable to different elevations automatically in response to changes in said condition, a measuring scale arranged parallel with said tube, a sighting member mounted for movement along said tube and into sighting relation with the top of said mercury column, an index mounted for movement with said sighting member and cooperating with said scale, an elongated cam member arranged alongside of said tube and generally parallel thereto, said cam member having a cam surface along the length thereof which departs from a vertical reference line by different amounts along different linear sections of said tube, and means including a cam follower mounted for movement with said sighting member and controlled by said cam surface for imparting relative movement between said sighting member and said index in a vertical direction and in proportion to the departure of said cam surface from said reference line.

2. An instrument according to claim 1 wherein said cam member comprises a straight rod pivotally supported at its lower end and including means for supporting the upper end of said rod for tilting adjustment with respect to a vertical reference line.

3. An instrument according to claim 2 wherein said mercury column responds to barometric pressure and said means for supporting the upper end of said rod for tilting adjustment includes a scale plate arranged transversely of said measuring scale at the upper end of said rod and having a temperature scale formed along one edge thereof and a gravity scale formed along the other edge thereof, an index member carrying an index mark arranged parallel with each scale on said scale plate, means securing one of said index members in fixed relation to said measuring scale, means mounting the other index member for longitudinal movement thereof with the movement of the upper end of said rod, and means for mounting said scale plate for longitudinal adjustment with respect to one of said index members.

4. A correction mechanism for a measuring instrument having a transparent, rigid tube arranged in a vertical position and containing a mercury column and a scale therefor comprising, in combination, an elongated cam member arranged alongside of said tube and having a cam surface along the length thereof which departs from a vertical reference line by different amounts along different linear sections of said tube, a sighting member mounted for movement along said tube and into sighting relation with the top of said mercury column, an index mounted for movement with said sighting member and cooperating with said scale, and means including a cam follower mounted for movement with said sighting member and controlled by said cam surface for imparting relative movement between said sighting member and said index in a vertical direction.

5. In an instrument for indicating the magnitude of a variable condition, the combination of a condition responsive member movable along a rectilinear path automatically in response to changes in said condition and being subject to certain errors, a measuring scale arranged parallel with the path of movement of said member, indicator means including a sighting member mounted for movement parallel with the movement of said condition responsive member and having an index cooperating with said scale to indicate the extent of movement of said member, said sighting member being movable into sighting relation with a selected point on said condition responsive member, a rod arranged parallel with the path of movement of said member, means for moving one end of said rod to tilt said rod out of parallel relation with the path of said member, and means carried by said indicator means and cooperating with said tilted rod for imparting relative movement between said index and said sighting member in the direction of movement of said indicator means and in proportion to the tilt of said rod.

6. In an instrument for indicating the magnitude of a variable condition, the combination of a transparent, rigid tube arranged in a vertical position and containing a mercury column movable to different elevations automatically in response to changes in said condition, a vertical guide bar arranged parallel with said tube, a measuring scale arranged parallel with said guide bar, a slide mounted on said guide bar for movement longitudinally thereof, a sighting member carried by said slide and being movable into sighting relation with the top of said mercury column, an index carried by said slide and arranged to cooperate with said scale, an elongated cam member arranged generally parallel to said guide bar and having a cam surface along the length thereof which varies in spacing from a vertical reference line by different amounts along different linear sections of said guide bar, and means including a cam follower carried by said slide and engaging said cam surface for imparting relative movement between said sighting member and said index in a vertical direction and in proportion to the departure of said cam surface from said reference line.

7. An instrument according to claim 6 wherein said cam follower includes a bell-crank lever pivotally secured to said slide for pivotal movement in a plane parallel to the plane of tilting of said cam bar, resilient means for maintaining one arm of said lever in contact with the cam surface of said cam bar and a connection between the other arm of said lever and said sighting member for imparting vertical movement to said sighting member in proportion to the angle of movement of said lever.

8. In an instrument for indicating the magnitude of a variable condition, the combination of a transparent, rigid tube arranged in a vertical position and containing a mercury column movable to different elevations automatically in response to changes in said condition, a vertical guide bar arranged parallel with said tube, a measuring scale arranged parallel with said guide bar, a slide mounted on said guide bar for movement longitudinally thereof, a sighting member carried by said slide and being movable into sighting relation with the top of said mercury column, an index member carried by said slide and arranged to cooperate with said scale, one of said members being mounted for limited vertical movement with respect to said slide, and a motion translating mechanism controlled by the movement of said slide from its zero position for vertically shifting said vertically movable member with respect to said slide in proportion to the extent of movement of said slide from said zero position.

9. An indicating instrument according to claim 8 wherein said motion translating mechanism comprises a cam device including a cam bar element and a cam follower element, a support for said cam follower mounted for movement in a straight line, means moving said follower support in proportion to the movement of said slide, means supporting said cam bar for pivotal movement about one end thereof to different angular positions with respect to the line of movement of said follower support, and a connection from one of said cam elements for imparting vertical movement to said vertically movable member in proportion to the angle of adjustment of said bar.

EDWARD C. HASS.

REFERENCES CITED

The following references are of record in the file of this patent:

UNITED STATES PATENTS

| Number | Name | Date |
| --- | --- | --- |
| 1,578,440 | Hoffman | Mar. 30, 1926 |
| 1,584,860 | Huff | May 18, 1926 |
| 1,894,366 | Cantacuzene | Jan. 17, 1933 |
| 1,950,497 | Kopp et al. | Mar. 13, 1934 |

FOREIGN PATENTS

| Number | Country | Date |
| --- | --- | --- |
| 234,556 | Germany | May 15, 1911 |